US005708811A

United States Patent [19]
Arendt et al.

[11] Patent Number: 5,708,811
[45] Date of Patent: Jan. 13, 1998

[54] SYSTEM AND METHOD FOR LAZY LOADING OF SHARED LIBRARIES

[75] Inventors: James Wendell Arendt, Round Rock, Tex.; Paul Placido Giangarra, Boca Raton, Fla.; Ravindranath Kasinath Manikundalam, Austin, Tex.; Donald Robert Padgett, Austin, Tex.; James Michael Phelan, Austin, Tex.

[73] Assignee: International Business Machines Corporation, Armonk, N.Y.

[21] Appl. No.: 391,300

[22] Filed: Feb. 21, 1995

Related U.S. Application Data

[63] Continuation of Ser. No. 23,643, Feb. 26, 1993, abandoned.
[51] Int. Cl.$^6$ ..................................... G06F 9/445
[52] U.S. Cl. .................... 395/712; 395/685; 395/413; 395/710
[58] Field of Search ..................... 395/700, 425, 395/712, 685, 413, 710; 364/280.4, 246.3

[56] References Cited

U.S. PATENT DOCUMENTS

| 5,241,623 | 8/1993 | Shah | 395/700 |
|---|---|---|---|
| 5,247,674 | 9/1993 | Kogure | 395/650 |
| 5,247,678 | 9/1993 | Littleton | 395/700 |
| 5,247,681 | 9/1993 | Janis et al. | 395/700 |
| 5,291,593 | 3/1994 | Abraham et al. | 395/600 |
| 5,291,601 | 3/1994 | Sands | 395/700 |
| 5,303,392 | 4/1994 | Carney et al. | 395/775 |
| 5,359,721 | 10/1994 | Kempf et al. | 395/700 |

OTHER PUBLICATIONS

*PC Tech Journal*, vol. 6, No. 9 Sep. 1988, "OS/2's Dynamic Link", DeWolf et al, pp. 101–108.

*8239 Software Practice & Experience*, vol. 19, No. 9, Sep. 1989, "The Oberon System", Wirth et al, pp. 857–893.

Kempf et al. Cross–Address Space Dynamic Linking. Proceedings of the 2nd Intern. Workshop on Object Orientation in Operating Sysetms. IEEE Comp. Press. Conference Date: 24–25 Sep. 1992.

IBM TDB, "Transparent Dynamic Subroutine Loader", vol. 28, No. 12, May 1986, pp. 5535–5537.

IBM TDB, "Execution–Time Loading Using Self–Modifying Stubs", vol. 29, No. 8, Jan. 1987, p. 3521.

IBM TDB, "Dynamic Link Library Mechanism in DOS Environment", vol. 34, No. 6, Nov. 1991, pp. 209–210.

Hirschsohn, Ian. Personal Supercomputing: Virtual Memory. 64–Bit Dr. Dobb's Journal, Aug. 1992 V17 N8 p. 50 (7).

Peacock, Jeffrey. Dynamic Shared Libraries, Unix Review May 1991 V9 N5 p. 37(6).

*Primary Examiner*—Lucien U. Toplu
*Attorney, Agent, or Firm*—George E. Clark; Jenkens & Gilchrist; Mark S. Walker

[57] ABSTRACT

Lazy loading of executable library objects reduces operating system overhead and memory commitment requirements by postponing object loading until object references are expected. Initial task loading allocates only the main executable and library objects referenced by that executable. Secondary referenced objects are not allocated. Object references cause page faults for allocated but not loaded pages. Page fault handling causes loading and fixup of executable objects. Page fault handling also determines the next level of object references and allocates memory for the next object level. Shared memory systems allow sharing of executable objects until explicitly referenced. Once referenced, memory fault causes copying and fixup to referencing task memory area.

7 Claims, 4 Drawing Sheets

SYSTEM AND METHOD FOR LAZY LOADING OF SHARED LIBRARIES

This is a continuation of application Ser. No. 08/023,643 filed Feb. 26, 1993, now abandoned.

BACKGROUND OF THE INVENTION

The patent application is related to the application entitled "Method and Apparatus for Interprocessor Communication" having attorney docket number AT993-024 and application Ser. No. 080/23,644. It is also related to "System for Multiple Co-Existing Operating System Personalities on a Microkernel" having attorney docket number AT993-026 and application Ser. No. 08/023,666. These applications are both assigned to the assignee of the present invention.

1. Field of the Invention

The present invention relates to information processing systems and more particularly to operating systems. Still more particularly, this invention relates to systems for controlling the loading of executable tasks by an operating system.

2. Background and Related Art

Computer operating systems control the operation of computer system components. Among the responsibilities of the operating system is loading other programs for execution. The other programs are typically application programs, but also may include operating system components. Loading programs involves finding the requested program on the program storage media, typically a hard disk file, and then bringing the program into memory and making it ready to be executed by the processor. The executable form has a specified format known to the loader that contains information necessary for processing that executable code. One of the processing steps the loader performs is address relocation. Addresses in the executable file are expressed relative to a beginning address. This beginning address or starting offset is not determined until the program is loaded into memory. Address relocation modifies the relative addresses so that they point to actual addressable locations in the system. Once the addresses have been fixed, the program is ready to execute.

Computer programs have become increasingly complex as system user requirements have expanded and as the capabilities of systems have increased. The increased capacity of microcomputer systems such as the IBM PS/2 computer system (PS/2 is a trademark of the IBM Corporation) is one example. Increased processor capacity and function has allowed complex word processing, spread sheet, database, and other business and scientific applications to be developed. Complex applications, however, result in increasingly larger executable files.

The generation of large executable files whenever a portion of an application or system changed increases the cost and time required to create or revise an application or system. One solution to this problem has been to divide applications or systems into segments that are dynamically loadable. Linking (address resolution) of these segments is deferred until execution time. Each segment is defined to contain a specific portion of code and is written to respond to well defined interfaces. Programs in other segments that access a particular segment object need not be changed or recompiled as long as that interface is constant. This provides greater flexibility in the development and maintenance of operating systems and application programs.

The dynamic linking concept has been implemented in the IBM OS/2 operating system product (OS/2 is a trademark of IBM Corporation.) OS/2 dynamic link libraries (or DLLs) are dynamically linked to provide defined functions to an operating system or application program. The interfaces to the DLLs are specified library interfaces. A program using a dynamic link library will contain a library interface call to that program. The compiler will track each of these external library calls and will include them in a section of the executable file. In the current system, when the OS/2 loader loads an executable program (typically stored as a file with a .EXE suffix) it scans the file to find all dynamic link library references. Each library function referenced is in turn dynamically loaded. The loader will check each of these libraries to determine whether they, in turn call other library functions. This checking and loading process continues recursively until all dynamic link references are resolved.

The current OS/2 operating system assigns memory addresses and user memory space to each of the libraries referenced by a task. Commonly used DLLs frequently reference other DLLs that in turn reference still other DLLs. As a result long chains of DLLs are allocated and mapped into each task. Many of these DLLs are specified to handle error or other exception conditions and are used only infrequently. This means that the large loaded memory is unnecessary most of the time. The large memory allocation also increases the overhead on the system since the memory manager must sift through this large allocated memory when determining which areas to replace in a paging system.

An additional problem exists in microkernel systems such as the Mach operating system developed by Carnegie Mellon University. The Mach microkernel allocates kernel, port identifiers for interprocess communications. The Mach kernel assigns a kernel port identifier to each DLL or more efficiently to each DLL object. The assignment of unreferenced ports interferes with efficient port resolution.

Dynamic subroutine loading schemes have been previously proposed, but each has suffered from disadvantages. The *IBM Technical Disclosure Bulletin*, May, 1986, pp. 5535–5537 contained an article entitled "Transparent Dynamic Subroutine Loader." The proposed technique required a special purpose dynamic loader to be linked with the main routine. The loader maintained tables of subroutine references and loaded subroutines as they were called. This approach was not integral to the operating system and did not support sharing between tasks. The tracking and loading applied only to the particular task. The requirement to link the dynamic loader program into the main program also limits transparency.

A slightly different approach was suggested in "Execution Time Loading Using Self Modifying Stubs", *IBM Technical Disclosure Bulletin*, January, 1987, p. 3521. This approach required subroutine stubs to be added to each main program. When the subroutine was first referenced the library copy was loaded and the stub modified to branch to the loaded library copy. This approach has the disadvantage of requiring special coding techniques and execution time modifications to program flow.

Finally, "Dynamic Link Library Mechanism in DOS Environment", *IBM Technical Disclosure Bulletin*, November, 1991, pp. 209–210 proposed a "terminate and stay resident" (TSR) routine in the DOS environment to manage a list of library routines. The routine responds to a "soft interrupt" generated by a special binding call inserted in the main routine. When the interrupt is received, the TSR routine checks a table to determine if the function has been previously loaded, and if not, it is loaded and the table updated. Control is then passed to the function. This approach has the disadvantage of requiring a special interrupt routine to manage the dynamic libraries. A requirement to insert special interrupt calls in the main program also limits general application.

The technical problem presented is to provide a mechanism for dynamically loading executable library objects only when such objects are required for execution. Solution of the problem should be transparent to the application developer and to the executing program, i.e., it should appear no different than if the library functions were linked into the main program.

SUMMARY OF THE INVENTION

The present invention is directed to a system for dynamically loading library objects only when they are required for execution. The system includes means for delaying the loading of unreferenced objects until a reference is made. The present invention incorporates this feature as part of system loader and execution processing and requires no change to the main executable program.

The present invention includes a system for managing allocation of memory to executable programs having means for receiving a request to load a primary executable program into memory, means for determining secondary executable programs referenced by the primary executable program, means for allocating memory slots to the secondary executable programs without loading the programs into memory; means for detecting references to one of the allocated but unloaded slots, the means for detecting generating a detect signal when a reference is detected; and means for loading the executable program allocated the slot into memory in response to the detect signal.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
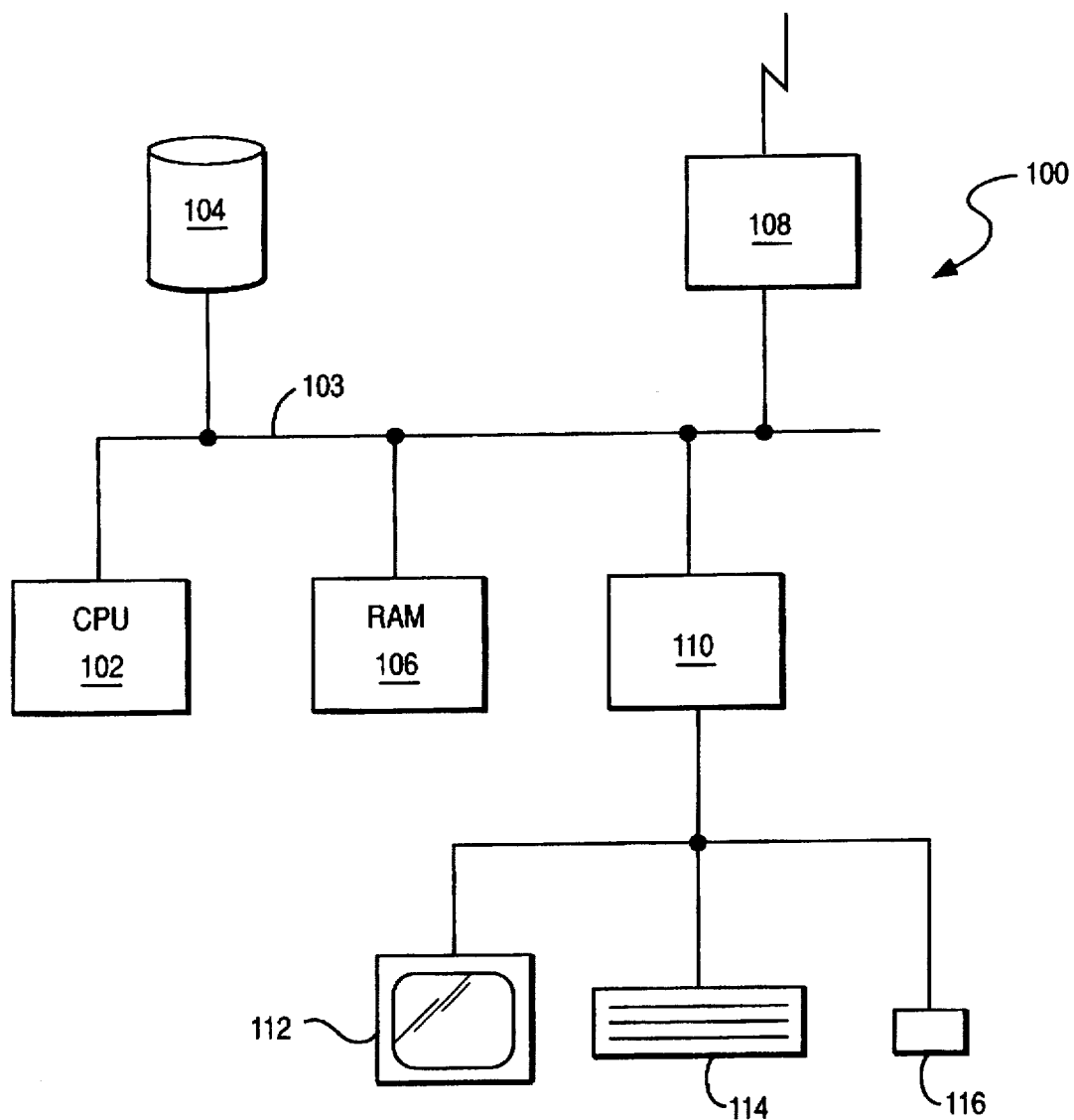
FIG. 1 is a block diagram illustrating an information processing system useable with the present invention.

The present invention is used in conjunction with an information processing system. An example of such a system is shown in FIG. 1 at 100. The system has a processing unit or CPU 102 interconnected by a system bus 103 to various system components. These components include, but are not limited to, hard disk storage 104, random access memory 106, network interface 108, input/output interface 110. The input/output interface coordinates input from a keyboard 114, pointing device 116, and controls output to a display 112. Additional permanent storage devices such as a diskette drive, a tape drive or a CD-ROM drive could be attached to such a system.

The information processing system on which the current system operates is preferably an IBM PS/2 computer system. The system and method disclosed are not limited to such a system, however, and are operable on other microcomputer systems, workstation systems such as the IBM RISC System/6000 workstation (RISC System/6000 is a trademark of IBM Corporation), or mainframe systems such as the IBM ES/9000 computer system (ES/9000 is a trademark of IBM Corporation.)

The preferred embodiment of the present invention is implemented in a system that supports dynamic link libraries (DLLs). These libraries have the property that each object in the library is relocatable at load time, i.e., it can be assigned any address by the loader.

Each executable module is stored in permanent storage (for example, on the hard disk) in a specified format. In the preferred embodiment, the main executable file and all dynamic link libraries are stored according to the "LX— Linear Executable Module" format. Storage formats could differ between the main executable and the dynamic link libraries or even within the dynamic link libraries as long as all formats are recognizable by the loader.

Figure 2:
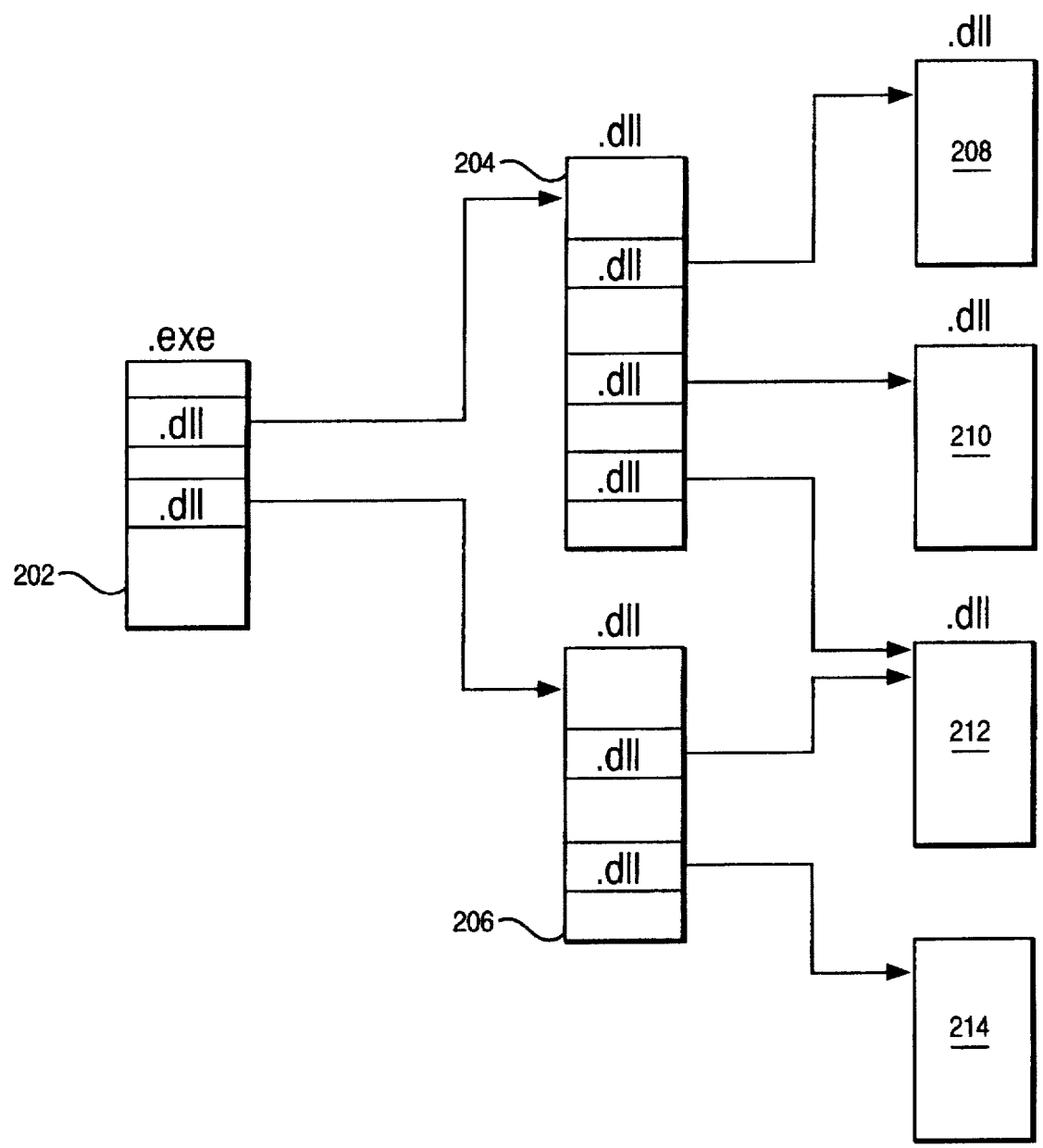
FIG. 2 is a diagram of the structure and interrelationships of executable objects.

The executable module is shown, for example, at 202 in FIG. 2. The main executable is the program first called to perform a function either by the operating system or directly by the user. An example of user invocation is the entry of the program name by the user at the operating system command prompt. E.g., entering MYPROGM would cause loading and execution of MYPROGM.EXE.

The executable module header contains numerous pieces of information required to load and execute the program. These include the module name, the version level, CPU or operating system dependencies, size of the module, fixup information needed to relocate addresses, and import module references to DLL modules to be imported at execution.

The main executable program references dynamic link libraries through the import module list. DLL references can occur because of explicit program invocations inserted by the system developer or can be inserted by the compiler during compilation. As shown in FIG. 2, module 202 contains references to objects in DLLs 204 and 206. Module 204 contains references to modules 208, 210, and 212, while module 206 contains references to modules 212 and 214.

Each dynamic link library (DLL) is divided into a number of objects containing text, shared data, and instance data. Executable objects can contain several routines or only one, depending upon the options selected when the objects were created. Each object is relocatable at load time, i.e., it can be assigned any address at load time. Each object is further divided into pages corresponding to the size of pages used in the virtual memory manager of the computer system. Each page has an associated "fixup stream" that identifies and encodes the addresses that must be modified when the module is loaded. These modifications are divided into local fixups where local addresses are offset by the starting address of the object and external fixups where the addresses are offset based on the addresses of other objects or other dynamic link libraries.

Figure 3:
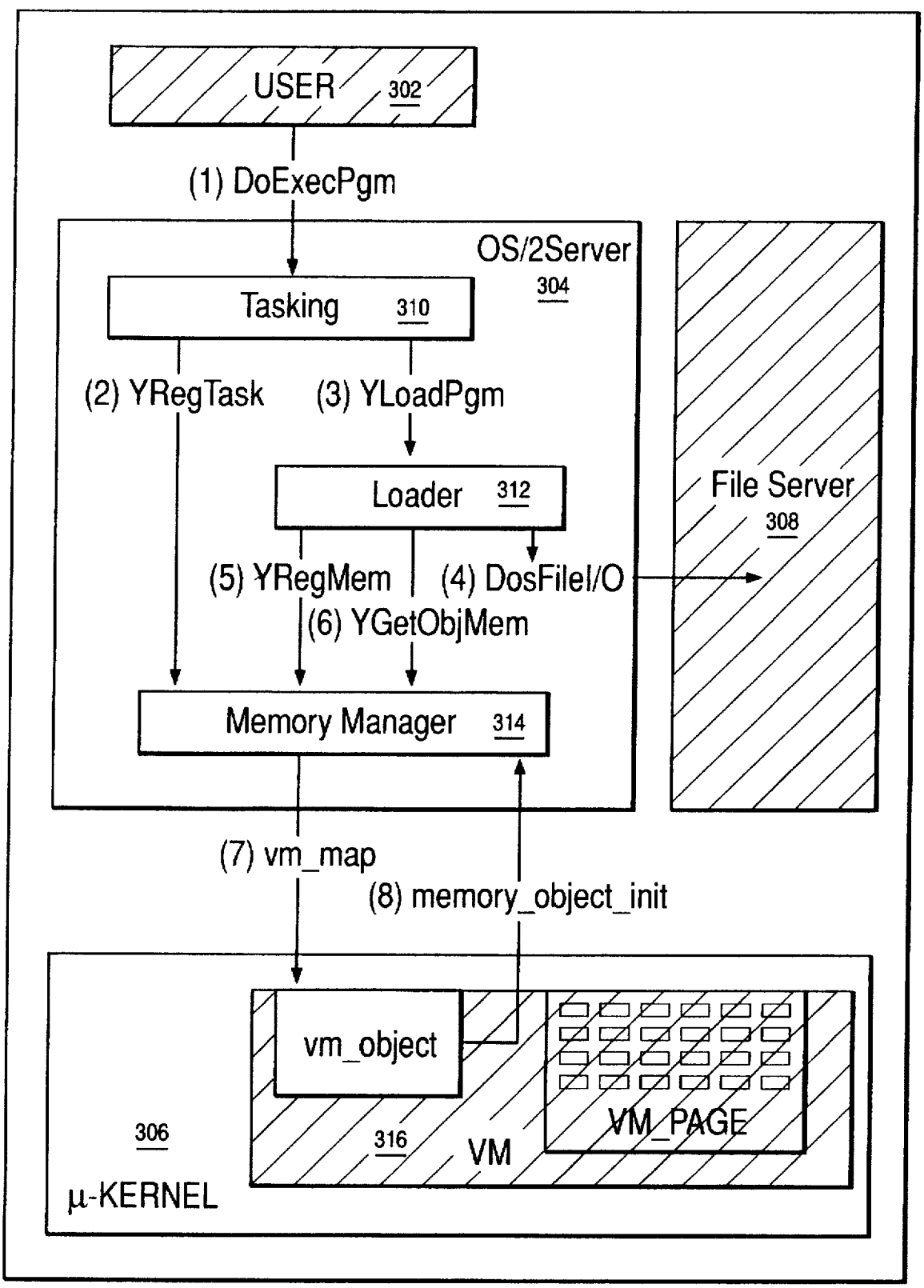
FIG. 3 is a block diagram showing the components of the preferred embodiment of the present invention.

The preferred embodiment of the present invention is implemented using a Mach microkernel based system having an OS/2 operating system personality. The major functional components of this system are shown in FIG. 3. The User 302 is a program running in user space. It may be an application or system utility program. The OS/2 Server 304 contains the operating system features of OS/2 providing an OS/2 user interface and generating the necessary microkernel service requests to microkernel 306. File server 308 manages the disk files or other persistent storage media.

OS/2 Server 304 contains three components of concern to the present invention. Tasking 310 establishes execution tasks for executing requested operations. Loader 312 performs the functions of requesting executable modules from the file server 308, fixing up the executable modules, and loading them into memory. Memory Manager 314 manages memory resources using microkernel memory management facilities. The microkernel has a virtual memory system 316. The virtual memory system manages the assignment of VM pages to memory objects and detects memory page faults. Page faults are caused by a task requesting a memory page that has been allocated to the task but is not currently in memory. Handling the fault requires paging out of unused or not recently used pages and paging in of the requested page.

Figure 4:
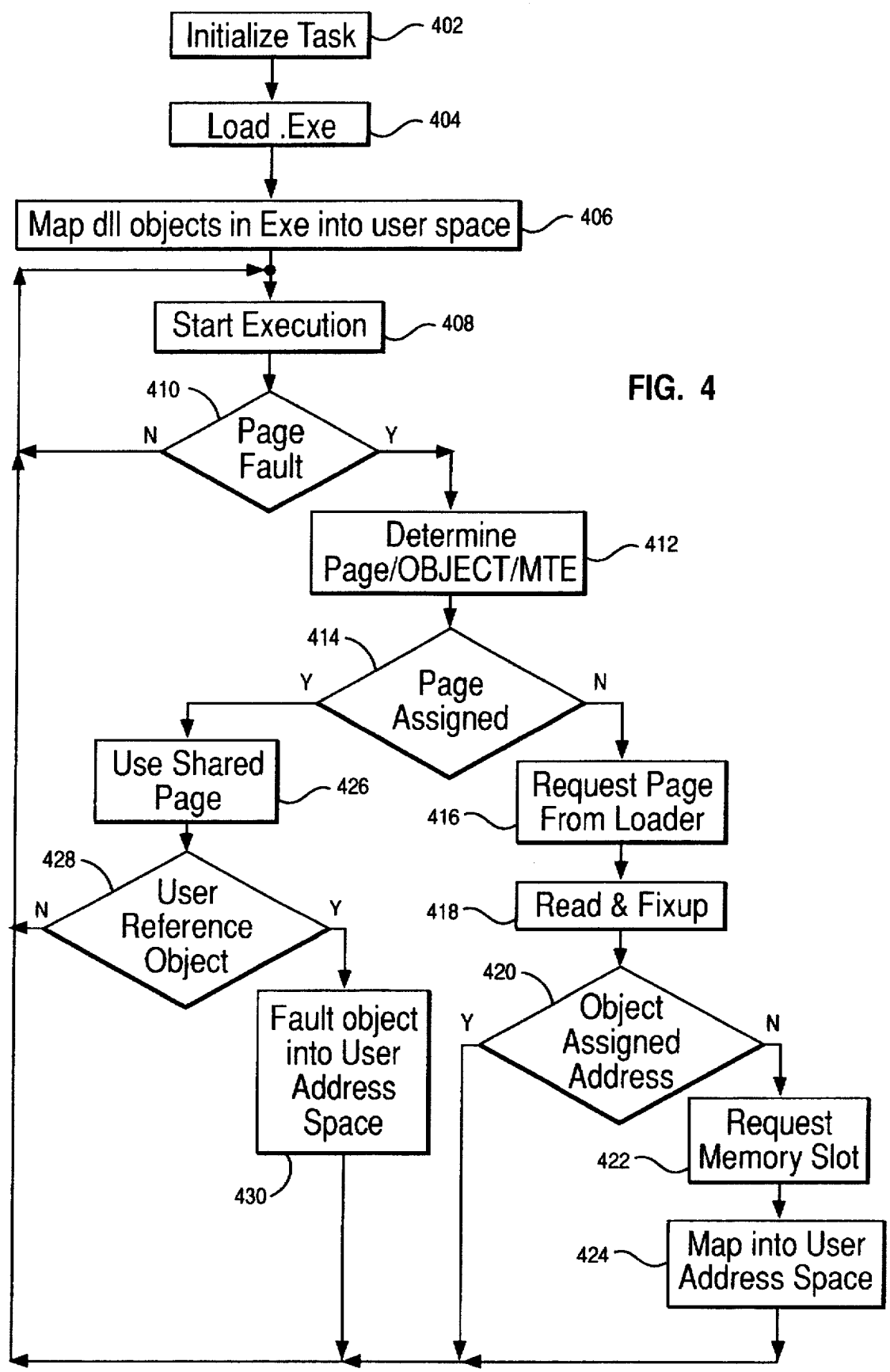
FIG. 4 is a flow chart illustrating the process steps of the present invention.

The operation of the lazy loading process of the present invention will be described with reference to FIG. 4 in conjunction with FIG. 3. The process begins with a user space request for executable program initialization 402. This causes Tasking 310 to create a task for execution and to register the task with the virtual memory system 316. Tasking next causes loader 312 to initiate 404 memory loading of the .EXE file. The loader accesses the .EXE file through the file server 308.

The loader begins loading the initial executable code 406. The loader fetches the .EXE header and builds a Module Table Entry (MTE) for the module. The module table entry is registered with VM 316. The loader creates a list of DLLs referenced by the .EXE file. For each .DLL object the loader determines whether an MTE exists for that DLL object, and if not, it accesses the DLL using the file server, loads and builds an MTE for the DLL object. The MTE is registered with VM.

Execution of the task then begins 408. The loading process maps each page of data associated with the .EXE and referenced .DLLs into the user virtual memory space, but the physical page is not loaded until referenced. A reference to a virtual memory page that is not loaded causes a page fault 410. An external pager is provided to handle memory object page faults. This pager causes the requested page to be loaded into user memory. Once a page has been loaded, the default microkernel pager handles subsequent loading or unloading.

A page fault 410 causes microkernel VM 316 to determine the object name, page and MTE 412. For valid pages, the external pager directs 416 the loader to fixup and load 418 the page. The fixup process detects any additional external objects, i.e., other DLL objects and determines whether that object has been allocated memory 420. If not, a memory slot of the appropriate size is requested 422 and the page mapped into the user address space 424.

The preferred embodiment is implemented in a shared memory system where tasks can share certain memory regions. When another user task references a page already assigned to one user 414 the kernel gives that second user task a copy of the page from the kernel cache avoiding the need for the loader to fixup the page. This sharing avoids the overhead of reading and fixing up that page again for the second user. When the second user references an object on the shared page, a memory protection fault is generated. Objects from the shared page were not loaded into the user space because no fixup was done, only copying of the fixed page. The server handles the fault by mapping the object into the second user's address space 430 and restarting the user task.

The above process results in delayed or lazy evaluation of the library object requirements. The loader postpones loading any library object until it is likely to be used. All DLLs objects references in the .EXE file are initially loaded because the initial execution can include any of those objects. As each DLL object is referenced, the next level of DLL objects referenced by that object is processed.

The present invention has the advantage of limiting memory allocation and loading to that required by referenced objects. This also limits the number of Mach ports and memory pages that must be assigned thereby reducing overall system overhead.

The preferred embodiment has been shown in conjunction with the Mach microkernel. It will be appreciated, however, by those skilled in the art, that the lazy loading process is not limited to this type of operating system. The process described herein may be adapted to other operating systems, and particularly to those supporting virtual memory management.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A method for loading an executable program into memory from permanent storage, the method comprising the steps of:
   a) receiving a request for the executable program, wherein the executable program includes a main executable file and first level object libraries;
   b) loading initial executable code of the main executable file into the memory;
   c) fetching an executable header of the main executable file from the permanent storage, wherein the executable header includes identity of the first level object libraries;
   d) obtaining a virtual memory entry for each object identified in the first level of object libraries;
   e) loading an object identified in one of the first level object libraries when the object is referenced;
   f) determining identity of the second level object library from the object;
   g) determining when an object identified in the second level object library is needed for execution; and
   h) when the object identified in the second level object library is needed, loading the object identified in the second level object library into the memory.

2. The method of claim 1, wherein step (h) further comprises:
   prior to loading the object identified in the second level object library, obtaining a virtual memory entry for the object identified in the second level object library.

3. The method of claim 1, wherein step (d) further comprises obtaining the virtual memory entry by:
   creating a list of objects identified in the first level object library;
   determining, for each object in the list of objects, whether a module table entry exists;
   when the module table entry does not exist, creating the module table entry; and
   when the module table entry exists, registering the module table entry with a virtual memory.

4. The method of claim 1, wherein step (e) further comprises loading the object identified in one of the first level object libraries by:

loading a page of the object into a user virtual memory space; and when the page is referenced, loading the page into the memory.

5. The method of claim 4 further comprises loading the page by:

determining that the page is stored in the user virtual memory space;

generating a page fault; and retrieving the page from the permanent storage in response to the page fault.

6. An apparatus for loading an executable program into memory from permanent storage, the apparatus comprising:

tasking block;

loading block; and virtual memory block;

wherein, when a user space requests an executable program:

the tasking block creates a task, registers the task with the virtual memory block, and causes the loader block to initiate memory loading of the executable program;

the loader block accesses a main executable file and objects identified in first level object libraries based on a executable file header, loads initial executable code of the main executable file into user memory, and, for each object identified in one of the first level of libraries, provides a module table entry which is registered with the virtual memory block;

the virtual memory block stores a virtual representation of the objects identified in the first level object libraries and a virtual representation of data of the main executable file;

wherein, when the user space is executing the executable program:

the tasking block detects when one of the objects identified in the first level object libraries is referenced by the initial executable code, generates a load command and determines a second level object library from the one of the objects identified in the first level object libraries;

the virtual memory block, in response to the load command, determines whether the one of the objects identified in the first level object libraries is currently in the user memory, and when the one of the objects identified in the first level object libraries is not in the user memory, generates a page fault, and provides a virtual representation of objects identified in the second level object library;

the loader block, in response to the page fault, accesses the one of the objects identified in the first level object libraries to load into the user memory.

7. The apparatus of claim 6, wherein, when the user space requests a second executable program, the task block generates a second task and registers the second task with the virtual memory block;

and wherein, when the user space is executing the second executable program and such execution references an object, the virtual memory determines whether the object already has a virtual representation from the execution of the executable program, and when the object does have the virtual representation, reusing the virtual representation for the execution of the second executable program.

* * * * *